Patented Dec. 23, 1924.

1,520,305

UNITED STATES PATENT OFFICE.

WALTER A. PATRICK, OF BALTIMORE, MARYLAND, ASSIGNOR TO THE SILICA GEL CORPORATION, OF BALTIMORE, MARYLAND, A CORPORATION OF MARYLAND.

METHOD OF PREPARING ADSORBENT AND CATALYTIC OXIDES.

No Drawing.     Application filed July 1, 1921. Serial No. 481,990.

*To all whom it may concern:*

Be it known that I, WALTER A. PATRICK, a citizen of the United States, and residing at Baltimore city, in the State of Maryland, have invented certain new and useful Improvements in Methods of Preparing Adsorbent and Catalytic Oxides, of which the following is a specification.

The present invention relates to a method of preparing adsorbent and catalytic materials. More specifically the invention is directed to a method of producing oxides of metals whose hydroxides are substantially insoluble in water, such as iron, chromium, manganese, copper, bismuth, lead, thorium, nickel and vanadium, either singly or in combination and in such physical state that they possess adsorbent and catalytic properties. The principal aim of the invention is to produce the oxides referred to above by a method which is commercially practicable, as distinguished from laboratory methods.

To this end the method of the present invention consists in treating a concentrated solution of a soluble salt of the aforesaid metals with a solution of a soluble alkali, such as sodium hydroxide, of such concentration and amount that after its mixture with the salt solution the resulting mixture is faintly alkaline. Preferably a very soluble salt such as a chloride is employed, and the ingredients are mixed with thorough stirring in order to prevent local heating and also for the purpose of disseminating the alkali immediately throughout the mixture to prevent excessive alkalinity in spots. A gelatinous precipitate, which is the hydroxide of the metal, forms immediately after the mixture of the salt and the sodium hydroxide.

In order to obtain a satisfactory product great care must be taken that the two solutions, that is the salt solution and the alkaline solutions be mixed at as low a temperature as is feasible. At no time should the temperature be permitted to rise above about 10° C. The object of keeping the temperature low is to obtain the precipitate in a finely divided condition, this being a necessary characteristic of the product in order that it have the best adsorptive properties.

The gelatinous precipitate thus obtained is washed free of sodium chloride with water. The next step consists in drying the product. To this end the precipitate is first dried in a stream of air at 75° to 120° C. After this heating the material will still retain a considerable quantity of water and the greater part of this is driven off by increasing the temperature up to 300° to 400° C. It may, however, be dried at 120°, but this will take longer. The method of drying may be modified by taking the material after the first heating step mentioned above, and subjecting the same to a vacuum to further remove the water, the temperature during this vacuum treatment being from 75° to 120° C.

By mixing solutions of soluble salts of a plurality of said metals and sodium hydroxide or an equivalent, an adsorbent and catalytic material will be obtained, which may be termed a plural oxide. The temperature during the mixing should be kept low as already described and the precipitate obtained by the mixing should be dried as previously set forth. In this manner plural oxides of any number or combination of said metals may be obtained.

What I claim as new and desire to secure by Letters Patent is:

1. Method of preparing a highly adsorbent and catalytic oxide of a metal whose hydroxide is substantially insoluble in water, consisting in mixing with thorough stirring a concentrated solution of a soluble salt of said metal and a solution of a soluble alkali of such concentration and amount that the resulting mixture is faintly alkaline, said mixture being maintained at a temperature not exceeding about 10° C., and washing and thereafter drying the gelatinous precipitate obtained.

2. Method of preparing a highly adsorbent and catalytic oxide of a metal whose hydroxide is substantially insoluble in water, consisting in mixing with thorough stirring a concentrated solution of a soluble salt of said metal and a solution of sodium hydroxide of such concentration and amount that the resulting mixture is faintly alkaline, said mixture being maintained at a temperature not exceeding about 10° C., and washing and thereafter drying the gelatinous precipitate obtained.

3. Method of preparing a highly adsorbent and catalytic oxide of a metal whose hydroxide is substantially insoluble in water, consisting in mixing with thorough stirring a concentrated solution of a chloride of said metal and a solution of sodium hydroxide of such concentration and amount that the resulting mixture is faintly alkaline, said mixture being maintained at a temperature not exceeding about 10° C., and washing and thereafter drying the gelatinous precipitate obtained.

4. Method of preparing a highly adsorbent and catalytic oxide of a metal whose hydroxide is substantially insoluble in water, consisting in mixing with thorough stirring a concentrated solution of a chloride of said metal and a solution of soluble alkali of such concentration and amount that the resulting mixture is faintly alkaline, said mixture being maintained at a temperature not exceeding about 10° C. and washing and thereafter drying the gelatinous precipitate obtained.

5. In the method of preparing a highly adsorbent and catalytic oxide of a metal whose hydroxide is substantially insoluble in water, the steps of mixing with thorough stirring a concentrated solution of a soluble salt of said metal and a solution of sodium hydroxide and maintaining the resulting mixture at a temperature not exceeding about 10° C.

6. The method of preparing highly adsorbent and catalytic iron oxide, consisting in mixing with thorough stirring a concentrated solution of iron chloride and a solution of sodium hydroxide of such concentration and amount that the mixture is faintly alkaline, said mixture being maintained at a temperature not exceeding about 10° C. and washing and thereafter drying the gelatinous precipitate obtained.

7. In the method of preparing a highly adsorbent and catalytic iron oxide the steps of mixing with thorough stirring a solution of a soluble iron salt and sodium hydroxide and maintaining the resulting mixture at a temperature not exceeding about 10° C.

8. In the method of preparing a highly adsorbent and catalytic oxide of a metal whose hydroxide is substantially insoluble in water, the steps of mixing with thorough stirring a concentrated solution of a soluble salt of said metal and a solution of soluble alkali and maintaining the resulting mixture at a temperature not exceeding about 10° C.

9. The method of preparing highly adsorbent and catalytic iron oxide, consisting in mixing with thorough stirring a concentrated solution of iron chloride and a solution of soluble alkali of such concentration and amount that the mixture is faintly alkaline, said mixture being maintained at a temperature not exceeding about 10° C. and washing and thereafter drying the gelatinous precipitate obtained.

10. In the method of preparing a highly adsorbent and catalytic iron oxide the steps of mixing with thorough stirring a solution of a soluble iron salt and soluble alkali and maintaining the resulting mixture at a temperature not exceeding about 10° C.

In testimony whereof I hereunto affix my signature.

WALTER A. PATRICK.